Patented Feb. 20, 1923.

1,446,178

UNITED STATES PATENT OFFICE.

THOMAS F. HARRINGTON, OF GALION, OHIO.

PLASTIC COMPOSITION.

No Drawing. Application filed January 24, 1921. Serial No. 439,685.

*To all whom it may concern:*

Be it known that I, THOMAS F. HARRINGTON, a citizen of the United States, residing at Galion, Crawford County, Ohio, have invented certain new and useful Improvements in Plastic Composition, of which the following is a description.

My invention relates to a composition of matter which is particularly adapted to be used in constructing casings of various kinds where qualities of great strength and durability are required and where the material is not effected by the natural elements of the air or beneath the ground.

One object of my invention is to provide a composition of matter which shall have the characteristics of concrete so far as durability is concerned but which is sufficiently flexible or resilient, that it will not crack when subjected to constant changes of heat or cold as is frequently the case with concrete, and also a material which is impervious to water.

It is also an object of my invention to produce a material which has great tensile and compression strength thus permitting it to be used in a great variety of places where steel is now used.

A further object of my invention is to provide a material which is absolutely waterproof, in either salt or fresh water, a material which is not attacked by insects, of any kind, and which being entirely mineral in its composition may be placed in the earth for an indefinite period without change or variation of any kind.

This material is also a non-conductor of heat or electricity and may be utilized for insulating material whenever desired. Illustrative of the uses to which this material may be put, I would mention that it may be used for vaults of various kinds, tiling, tank linings, ship hulls, sidewalks, etc.

In carrying out my invention I require as a base a mineral substance, such as asphalt which is hard and brittle when cold and it has a viscous tendency when subjected to sufficient heat. The composition consists of a mixture of a mineral pitch, such as asphalt, a light porous earthy rock, such as diatomaceous earth, which is a pure silica in cellular form, a cement, preferably Portland cement, a caustic substance, such as lime and in some instances with the addition of powdered granite or marble. In providing the composition I prefer to use the ingredients in about the following proportions, viz:

3 parts of asphalt, 1 part of lime, 4 parts of diatomaceous earth and 4 parts of cement, although good results may be obtained by varying these proportions or by substituting other ingredients having the properties of asphalt, diatomaceous earth, lime and cement.

I have had very satisfactory results by varying the proportions of the above ingredients within the following limits—asphalt 2 to 4 parts, lime, ½ to 2 parts, diatomaceous earth 3 to 5 parts, cement 3 to 5 parts and powdered granite or marble, 1 to 3 parts.

In combining these ingredients the asphalt is first subjected to sufficient heat to reduce it to liquid form; the cement, lime and diatomaceous earth in approximately the parts named have previously been reduced to powdered form and thoroughly mixed, is then added to the liquid and incorporated therewith while hot by thoroughly mixing these ingredients together, after which it is either poured into moulds of any size or shape required for the purpose it is intended, but it may be applied while hot in the form of one or more coats or layers in the original manner according to the nature of the article and the thickness of the coating required.

The compound cools and thickens very quickly and when cold the mass may be cut into slabs or used in any way desired for manufacture into other articles. This composition of material is lighter in weight than asphalt, is a non-conductor of heat and electricity, is absolutely impervious to water, will not crack, and can be subjected to hard usage for an indefinite period of time.

When this composition of matter is to be used for sidewalks or other tread surfaces of any kind, I prefer to add to the above ingredients from 1 to 3 parts of granite or marble dust to give the necessary hard finish surface.

When granite or marble is used it is incorporated in powdered form with the other powdered ingredients and mixed with the asphalt while in a liquid state.

I claim—

1. A composition consisting of three parts asphalt, one part lime, four parts diatomaceous earth and four parts cement.

2. A composition comprising two to four parts asphalt, one-half to two parts lime, three to five parts diatomaceous earth and three to five parts cement.

3. A composition comprising two to four parts asphalt, one-half to two parts lime, three to five parts diatomaceous earth, three to five parts cement, and one to three parts powdered granite.

In testimony whereof I have signed this specification.

THOMAS F. HARRINGTON.